United States Patent
Pasini et al.

(10) Patent No.: US 10,129,086 B2
(45) Date of Patent: Nov. 13, 2018

(54) COLLECTION OF PERFORMANCE DATA IN A COMMUNICATIONS NETWORK

(71) Applicant: TELEFONAKTIEBOLAGET LM ERICSSON (PUBL), Stockholm (SE)

(72) Inventors: Federico Pasini, Genoa (IT); Maurizio Pighetti, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 234 days.

(21) Appl. No.: 14/912,460

(22) PCT Filed: Aug. 28, 2013

(86) PCT No.: PCT/EP2013/067833
§ 371 (c)(1),
(2) Date: Feb. 17, 2016

(87) PCT Pub. No.: WO2015/028056
PCT Pub. Date: Mar. 5, 2015

(65) Prior Publication Data
US 2016/0205009 A1    Jul. 14, 2016

(51) Int. Cl.
G06F 15/173    (2006.01)
H04L 12/24    (2006.01)
H04L 12/26    (2006.01)

(52) U.S. Cl.
CPC ........ *H04L 41/0853* (2013.01); *H04L 43/103* (2013.01); *H04L 41/044* (2013.01); *H04L 41/12* (2013.01); *H04L 43/0817* (2013.01)

(58) Field of Classification Search
CPC ............... H04L 41/0853; H04L 43/103; H04L 43/0817; H04L 41/12; H04L 41/044
See application file for complete search history.

(56) References Cited

U.S. PATENT DOCUMENTS 6,791,998 B1    9/2004    Yoshihara et al.
2002/0112040 A1    8/2002    Chang et al.
(Continued)

FOREIGN PATENT DOCUMENTS

GB    2386285 A    9/2003
WO    2012092268 A1    7/2012

OTHER PUBLICATIONS

Callon, "Use of OSI IS-IS for Routing in TCP/IP and Dual Environments," Network Working Group, Dec. 1990.
(Continued)

*Primary Examiner* — John B Walsh
(74) *Attorney, Agent, or Firm* — Patent Portfolio Builders, PLLC (57) ABSTRACT

A Data Communication Network couples a Management System to Network Elements. The Data Communication Network comprises a Gateway Network Element and a number of the Network Elements subtended by the Gateway Network Element. A method performed by the Management System comprises: a) determining the number of Network Elements that are subtended by the Gateway Network Element; b) determining a value of an interval parameter for the Network Elements based on the number of the Network Elements that are subtended by the Gateway Network Element, wherein the interval parameter is a duration over which performance data is collected by the Network Element; and c) assigning the determined value of the history control interval parameter to the Gateway Network Element and the subtended Network Elements.

16 Claims, 9 Drawing Sheets

(56) References Cited

U.S. PATENT DOCUMENTS

2003/0061339 A1\* 3/2003 Benfield ............ H04L 41/0213
709/224
2010/0239255 A1\* 9/2010 Ikeda ................... H04J 3/1694
398/66

OTHER PUBLICATIONS

International Search Report dated Jun. 13, 2014 in related International Application No. PCT/EP2013/067833.
International Telecommunication Union, "Architecture and specification of data communication network," ITU-T G.7712/Y.1703, Sep. 2010.
ISO, "Protocol for Providing the Connectionless-Mode Network Services," Network Working Group, Dec. 1984.
Oran, "OSI IS-IS Intra-domain Routing Protocol," Network Working Group, Feb. 1990.
Waldbusser, "Remote Network Monitoring Management Information Base," Network Working Group, May 2000.
International Standard, "Information technology—End system to intermediate system routeing information exchange protocol for use in conjunction with the protocol for providing the connectionless-mode network service (ISO/IEC 8473)," ISO/IEC 9542, Second edition, 1994.

\* cited by examiner

COLLECTION OF PERFORMANCE DATA IN A COMMUNICATIONS NETWORK

TECHNICAL FIELD

This invention relates to collection of performance data in a communications network.

BACKGROUND

A communications network comprises a plurality of Network Elements (NE). Paths can be formed between Network Elements at the data plane to carry traffic across the network. The network may also comprise an Operational Support System (OSS). The OSS is provided to manage the network, and can collect performance data from Network Elements.

The managed NEs are connected to the OSS via a Data Communication Network (DCN), as described in International Telecommunication Union Recommendation ITU-T G.7712. The DCN can comprise computers, routers/switches and managed equipments compliant with ITU-T Q.811. The DCN allows network element management from OSS applications, and a healthy DCN allows the OSS applications to run at the best performance and to respond nearly real time to the given task.

RFC 2819 defines the Remote Network Monitoring Management Information Base. In this RFC, historical performance counters are collected using a HistoryControlEntry table. The NE stores performance data and a management system can periodically retrieve the performance data at a granularity determined by a counter maintained at the NE. The time period of this counter is defined by a parameter historyControlInterval. The value of this parameter can be configured in the range from 1 to 3600 seconds.

It is desirable that the OSS collects as much performance data as possible. This can result in an operator setting the history control interval parameter to a low value (i.e. short interval between sending reports). However, this can overload the DCN and can affect the responsiveness of the other services supported by the management system.

SUMMARY

An aspect of the present invention provides a method for a Management System of a communications network comprising Network Elements. A Data Communication Network couples the Management System to the Network Elements. The Data Communication Network comprises a group of the Network Elements. The group comprises a Gateway Network Element and a number of the Network Elements subtended by the Gateway Network Element. The method comprises a) determining the number of the Network Elements that are subtended by the Gateway Network Element. The method further comprises b) determining a value of an interval parameter based on the number of the Network Elements that are subtended by the Gateway Network Element. The interval parameter is a duration over which performance data is collected by each of the group of Network Elements. The method further comprises c) assigning a value of the interval parameter to each of the group of Network Elements based on the determined value.

Advantageously, step b) comprises determining a minimum value of the interval parameter based on a routing capacity of the Gateway Network Element.

Advantageously, step b) determines a minimum value of the interval parameter and step c) assigns a value of the interval parameter which is equal to, or greater than, the determined minimum value.

In a simplest case, the value assigned at step c) is the value determined at step b).

In any of the above, the same value can be assigned to each Network Element (Gateway NE, subtended NE) in the group of Network Elements. Alternatively, at least one of the Network Elements (Gateway NE, subtended NE) in the group of Network Elements can have a value which is different from the other Network Elements in the group. In the event of different values within a group of Network Elements, then it is advantageous that step b) determines a minimum value of the interval parameter and step c) assigns a value of the interval parameter which is equal to, or greater than, the determined minimum value.

Advantageously, steps b) and c) are repeated in the event of a change in the number of subtended Network Elements.

Advantageously, the method further comprises at least one of: determining when there is a change of operational status of a Network Element, determining when there is a change in topology of the Data Communication Network, determining when there is a change in management configuration, determining when there is a change in routing capacity due to a change in the Data Communication Network topology, determining when there is a change in routing capacity due to a change in a Data Communication Network protection path. Steps b) and c) can be repeated in the event of one of the above changes.

Advantageously, step b) comprises determining a portion of a routing capacity of the Gateway Network Element available for collection of performance data. Step b) can further comprise determining an amount of data required to collect performance data for the group of Network Elements. Step b) can further comprise determining a value of an interval parameter based on the portion of the routing capacity of the Gateway Network Element available for collection of performance data and the amount of data required to collect performance data for the group of Network Elements.

Advantageously, the portion of the routing capacity of the Gateway Network Element available for collection of performance data is user-programmable.

Advantageously, step b) comprises determining the value of the interval parameter, T, as:

$$T=((B/b)/(Q*p))$$

where: B is an amount of performance data collected per Gateway Network Element (in Bytes);
P=number of DCN packets required to carry B performance data bytes;
N=number of Network Elements in the group;
b=B/P; and
Q=routing capacity (in packets per second) of the Gateway Network Element.

Advantageously, the communications network comprises at least two Gateway Network Elements, and steps a) to c) are carried out for each Gateway Network Element.

Advantageously, the interval parameter is a history control interval parameter.

Another aspect of the present invention provides a Management System for a communications network comprising Network Elements. The Management System comprises a first interface for connecting to a Data Communication Network. The Data Communication Network is for coupling the Management System to the Network Elements, and the Data Communication Network comprises a group of the Network Elements. The group comprises a Gateway Network Element and a number of the Network Elements subtended by the Gateway Network Element. The Management System further comprises a second interface for receiving information about the Data Communication Network. The Management System further comprises an interval parameter determining module which is arranged to a) determine the number of the Network Elements that are subtended by the Gateway Network Element. The interval parameter determining module which is further arranged to b) determine a value of an interval parameter based on the number of the Network Elements that are subtended by the Gateway Network Element, wherein the interval parameter is a duration over which performance data is collected by each of the group of Network Elements. The interval parameter determining module which is further arranged to c) assign the determined value of the interval parameter to each of the group of Network Elements based on the determined value.

Advantageously, the second interface comprises an interface for connecting to a Data Communication Network Analyser.

Advantageously, the interval parameter determining module is arranged to determine a minimum value of the interval for each of the subtended Network Elements based on a routing capacity of the Gateway Network Element.

Advantageously, the Management System comprises an Optical Network Element Manager, ON-EM.

Another aspect of the present invention provides a Management System, a Gateway Network Element and a number of Network Elements subtended by the Gateway Network Element.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
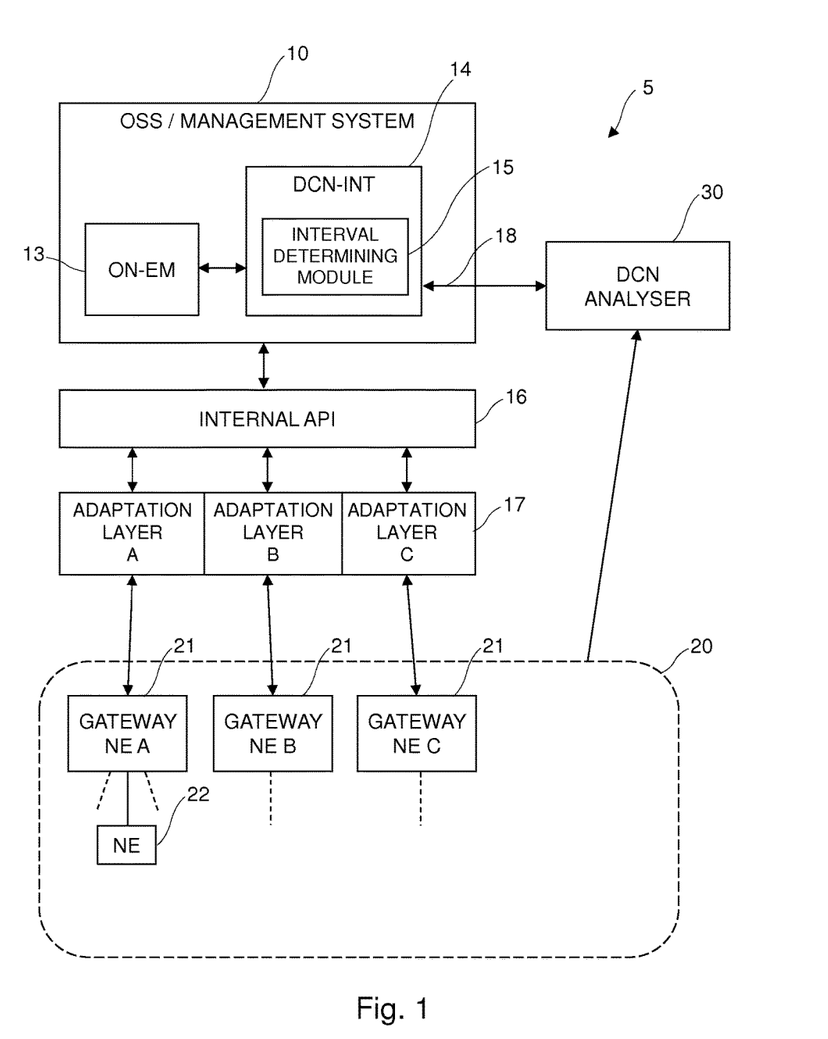
FIG. 1 shows a Management System and a Data Communication Network.

FIG. 1 shows a communications network 5. The network 5 comprises an Operational Support System (OSS) 10. The OSS 10 is provided to manage a network of Network Elements (NE), and can collect performance data from Network Elements. The terms OSS and Management System will be used interchangeably in this specification.

The managed NEs are connected to the OSS 10 via a Data Communication Network (DCN) 20. The DCN 20 comprises one or more Gateway Network Elements 21 in communicative contact with an Operational Support System 10 via an interface. The interface can comprise an internal Application Programming Interface (API) 16 and an adaptation layer 17 for each Gateway Network Element 21. The Gateway Network Elements (GNE) 21 are connected to Network Elements (NE) 22. In the following description, the phrase subtended Network Elements will be used to describe NEs 22 connected to a Gateway NE 21. In this respect, the Network Elements 22 are arranged at a lower hierarchical networked level than the respective Gateway Network Element 21, such that the Network Elements 22 are required to route network traffic through the respective Gateway Network Element 21 to communicate with the OSS 10. In the example of FIG. 1 there are three Gateway Network Elements 21, but there may be only one Gateway NE 21, or a larger number of Gateway NEs 21.

Although not shown in FIG. 1, the GNEs 21 and NEs 22 form part of a transport network, such as an optical transport network.

The DCN 20 can comprise a first part which uses in-band resources of the transport network and a second part (e.g. called an Access DCN) which uses dedicated out-of-band resources, such as an Ethernet network. The Gateway NE 21 can provide connectivity between the first part and the second part, i.e. between the part of the DCN which uses in-band resources and the Access DCN. The Gateway NE 21 provides routing capabilities to access NEs 22 behind them. The in-band resources of the DCN can comprise Data Communications Channels (DCCs), Optical Supervisory Channels (OSCs), General Communications Channels (GCCs) between NEs. The DCN can comprise computers, routers/switches and managed equipments compliant with ITU-T Q.811.

Further entities within FIG. 1 are now described. The Optical Network Element Manager (ON-EM) 13, represents an OSS Network Element Management application which is typically deployed to allow FCAPS (Fault, Configuration, Accounting, Performance, Security) functionalities on the Transport Network.

The Data Communication Network Analyser (DCN-ANA) 30 represents a network apparatus and associated application which is able to discover and monitor the routing protocol topology of the DCN 20. Advantageously, the DCN-ANA 30 provides a meaningful graphical representation of the DCN topology in terms of nodes, links and roles (NE, GNE, Access router).

The DCN Integrator (DCN-INT) 14 represents a module which can acquire, via an interface 18 with the DCN-ANA 30, the list of NEs with associated GNE/B-GNEs, and to process the algorithm for configuring the Remote Network Monitoring (RMON) performance collection granularity on the managed NEs. The DCN Integrator 14 acts as an additional component of an Optical Network Element Manager 13. An interval parameter determining module 15 is arranged to determine a value of an interval parameter for the Network Elements, in a manner which is described below. The interval parameter determining module 15 can form part of the DCN-INT module, or some other part of the management system. In accordance with an embodiment, the DCN-INT 14 can be the entity which determines the value of the history collection interval used for collecting performance data from NEs. The DCN-INT can be a generic component, unaware of the specific NE management communication protocol. It can be arranged to notify the values to the Optical Network Element Manager (ON-EM) 13 and the ON-EM can forward this information to the different adaptation layers 17 (typically through NE independent API 16) which translate it into specific messages for the different NEs.

Figure 2:
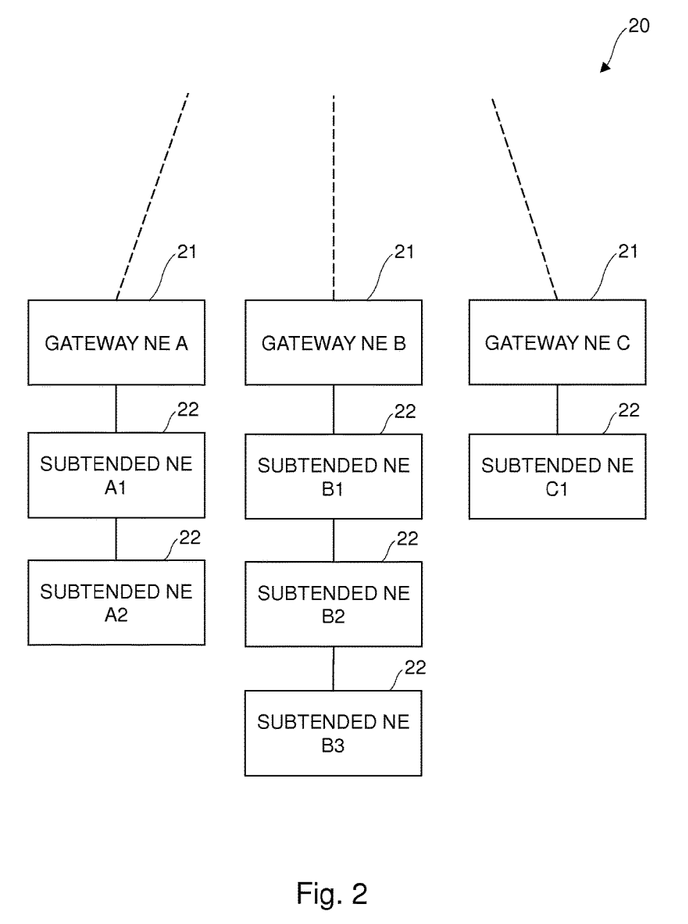
FIG. 2 shows an example topology of the Data Communication Network.
Figure 3:
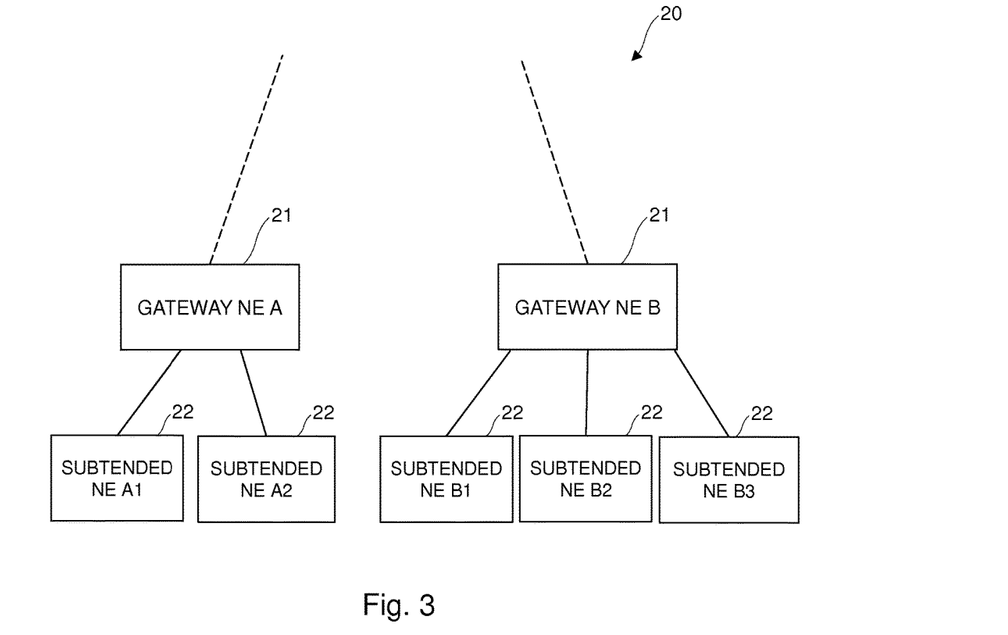
FIG. 3 shows another example topology of the Data Communication Network.

FIGS. 2 and 3 shows some example topologies for Gateway NEs 21 and subtended NEs 22. FIG. 2 shows a first group of NEs comprising a Gateway NE A 21 with subtended NEs A1 and A2. FIG. 2 also shows a second group of NEs comprising a Gateway NE B with subtended NEs B1, B2 and B3. FIG. 2 also shows a third group of NEs comprising a Gateway NE C with a subtended NE C1. As shown in FIG. 2, the number of subtended NEs per Gateway NE 21 can vary. In FIG. 2 each set of subtended NEs 22 are connected in a series configuration. Management data to/from NE A1 and NE A2 passes via Gateway NE NE A. Management data to/from NE A2 passes via NE A1 and Gateway NE A.

FIG. 3 shows an example of a star topology. FIG. 3 shows a first group of NEs comprising a Gateway NE A 21 with subtended NEs A1 and A2. FIG. 3 also shows a second group of NEs comprising a Gateway NE B with subtended NEs B1, B2 and B3. Management data to/from each of NE A1 and NE A2 reaches the Gateway NE A without passing via any intermediate NE. A mix of serial and star topologies is possible within a DCN.

One type of management data collected by the OSS 10 is performance data. Some examples of performance data collected by a NE are: records of counters representing performance statistics (e.g. packets sent, packets received, packets discarded, etc.) that a NE can collect on a logical/physical node interface base. The size and structure of these data records are described in RFC 2819.

Each NE maintains a parameter which determines an in interval over which the NE collects performance data. RFC 2819 defines the Remote Network Monitoring Management Information Base and historical performance counters are collected using the HistoryControlEntry table. The NE stores performance data and the management system can receive the historical counters every historyControlInterval seconds. This parameter can be configured by the management system itself in the interval from 1 to 3600 seconds. The description of the attribute is:

historyControlInterval OBJECT-TYPE
SYNTAX Integer32 (1 . . . 3600)
UNITS "Seconds"
MAX-ACCESS read-create
STATUS current
DESCRIPTION
"The interval in seconds over which the data is sampled for each bucket in the part of the media-specific table associated with this historyControlEntry. This interval can be set to any number of seconds between 1 and 3600 (1 hour).

A high PM collection granularity (low RFC 2819 history control interval) can saturate the DCN 20 and affect the responsiveness of the other services supported by the management system. A low PM collection granularity (high RFC 2819 history control interval) can be inadequate to efficiently monitor the network and provide the basis for a good statistical support to the operator's decisions. The topology of the DCN 20 may not be homogeneous over the different subtended network(s), so that each sub-network/network element could potentially have an ad-hoc setting for the supported RMON measure points; as a consequence setting up the same history control interval all over the network could not be an optimized choice.

Figure 4:
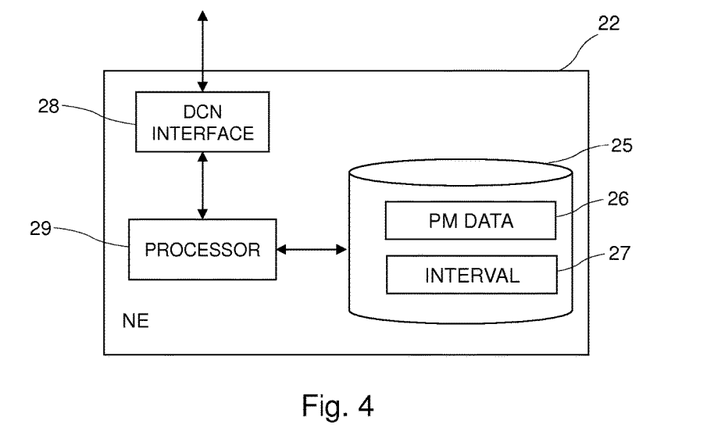
FIG. 4 shows a Network Element in the network of FIGS. 1 to 3.

FIG. 4 shows a NE 22 in more detail. A DCN interface 28 is provided for communicating with the Gateway NE 21 and OSS 10. A data store 25 stores a value of an interval parameter 27 over which performance data is to be collected and also stores the performance data 26. A processor 29 is in communicatively coupled to the store 25 and DCN interface 28 and can send the PM data 26 to the OSS at the expiry of the interval 27. The NE can receive a new value of the interval parameter 27 from the OSS 10.

In accordance with an embodiment, the RMON performance collection granularity (e.g. the RFC 2819 history control interval) is based on the DCN topology. The amount of collected performance data depends on:
1. The number of NEs;
2. The number of resources on each NE which are monitored;
3. The number and the size of counters which can be collected for a specific resource;
4. The granularity of collection of the historical counters (i.e. how often the PM counters are retrieved).

Typically, items (1) and (2) are configured by the operator according to the installed physical network and item (3) is defined by RFC 2819. DCN topology information obtained from the DCN Analyser 30 is used define the history control interval for each NE. This can be based on the number of NEs subtended to a common Gateway NE. The algorithm can calculate the smallest history control interval which is compatible with the number of NEs, RMON monitored resources and DCN topology and allocated load.

Figure 5:
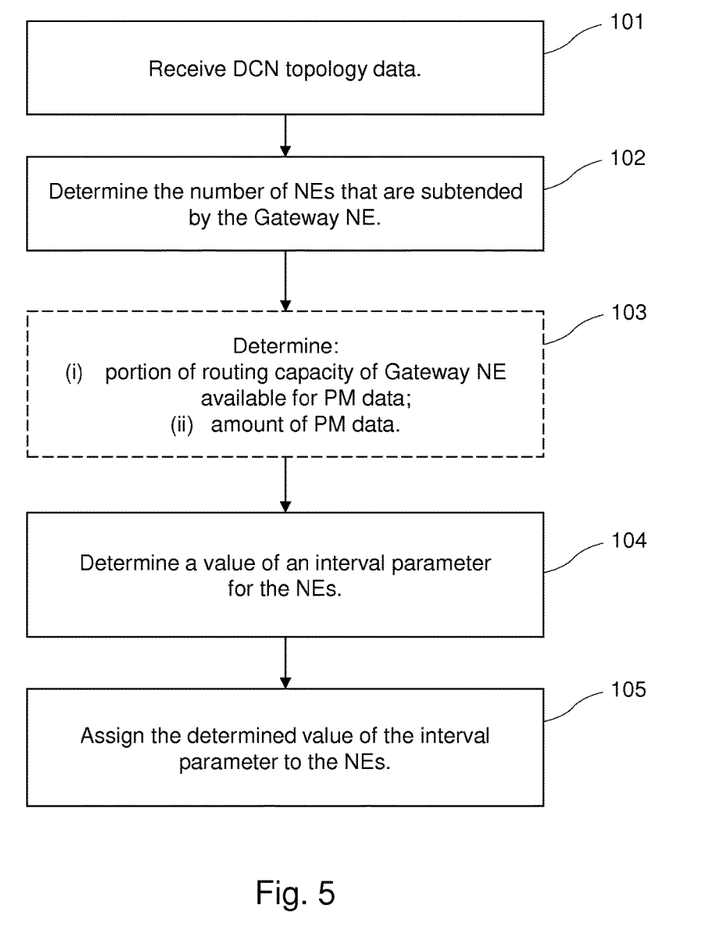
FIG. 5 shows a method of determining a value of an interval parameter for the Network Elements.

FIG. 5 shows a method performed by the OSS 10. At step 101 DCN topology data is received. The DCN Analyser 30 application can pass to the OSS system, for each managed NEs, the information about the Gateway Network Element (GNE) and, when available, the Back up GNE (B-GNE) in use to manage that specific NE. At step 102 the method determines the number of NEs subtended by the Gateway NE. At step 104 the method determines a value of an interval parameter for the NEs. At step 105 the method assigns the determined value of the interval parameter to the GNE and subtended NEs. Advantageously, the method can determine other quantities to help set the interval, as shown in optional step 103. Knowing the GNE routing capacity in terms of packets per second (PPS), it is possible for each NE behind it to set the minimum RFC2819 history control interval for each node to fully exploit the GNE routing capabilities without overloading it.

In the event of a fault occurring in the DCN which reduces the DCN routing capacity, it is possible to automatically or manually trigger a recalculation of the history control interval to assign a new value of the history control interval to each NE impacted by the fault.

In the event of the OSS detecting the unavailability of a network element (e.g. due to maintenance, failure or other reason), a history control interval recalculation can be triggered to distribute the available bandwidth among the remaining NEs.

The method of determining the history control interval will now be described in more detail. Assume the network operator wishes to collect, for each GNE, B bytes of performance data, where:

B=(bytes per NE) * N
P=number of DCN packets (between NE and OSS) required to move B performance bytes;
N=number of NEs in a group of NEs (i.e. a GNE and subtended NEs) in the DCN topology.

Assume that b is the average packet size in bytes of the performance records flow in DCN from NE to OSS:

b=B/P
Q=PPS associated to the gateway (1 PPS=B bytes/sec)
p=percentage of gateway PPS allocated for performance collection The Minimum history control interval is:

$$T=\text{floor } (B/(Q*p*b))=\text{floor } ((b*P)/(Q*p*b))=\text{floor } (P/(Q*p))$$

or, highlighting the relationship with the size of the moved data:

$$T=\text{floor } ((B/b)/(Q*p))$$

T is the minimum history control interval sustained by the DCN to collect the expected amount of performance data from selected NEs behind the GNE. The term "floor" in the above equations means "integer part of", i.e. floor (33.789)=33.

A simple numerical example will now be given to illustrate use of the above equations. An operator wishes to collect 8 MB (megabytes) (B) of PM data from a part of a network where the GNE have other 7 NEs behind, same NE type (N=8). Each packet in average is 1 KB (b=1KB), so 8000 packets (roughly) are needed (P=8000). GNE has DCN forwarding capacity of 200 PPS (Q), and the operator allocates 40% (p) of GNE throughput to this task. Then:

$$T=\text{floor } ((8MB/1KB)/(200*0.4))=100 \text{ seconds}$$

Triggers for recalculating the history control interval can be one or more of:

(i) a change of operational status of the NE. If a NE is offline then N is decreased.

(ii) a change in DCN topology. If a NE is added or removed, N is modified accordingly. A NE added/removed/modified in the DCN means a topology change at the NE side (changes on real transport network topology).

(iii) a change in management configuration. If a NE is added or removed, N is modified accordingly. A change in management configuration means no changes in real transport network topology (as in point (ii) above), but a change on the OSS (management system) configuration, e.g. how many nodes are really monitored by the OSS system.

(iv) a change in routing capacity (PPS) due to a change in the DCN topology. If there is a change in routing capacity, Q is modified accordingly.

(v) a change in routing capacity (PPS) due to a switch to a DCN protection path. If there is a change in routing capacity, Q is modified accordingly.

Some examples of configuring interval values will now be described with reference to FIGS. 6 to 9.

Figure 6:
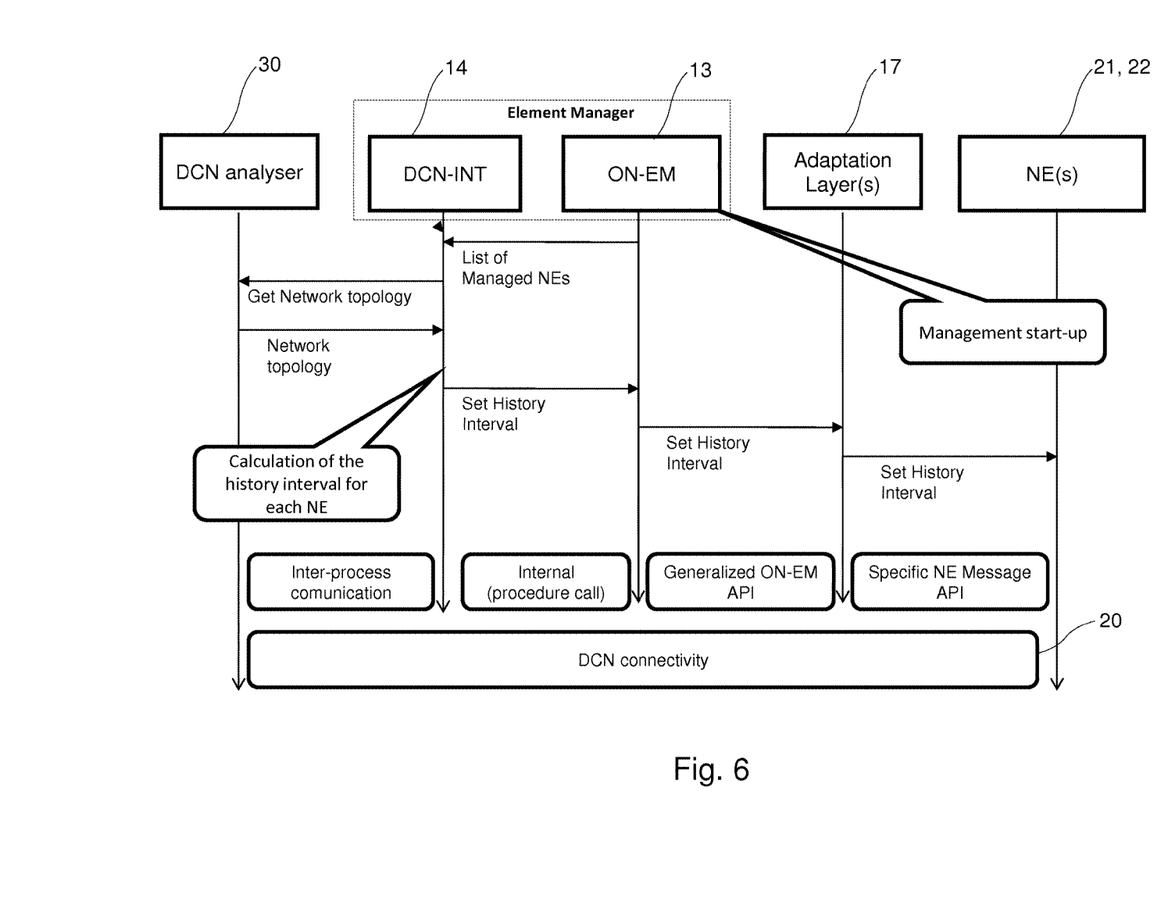
FIGS. 6 to 9 show signalling within the Data Communication Network.
Figure 7:
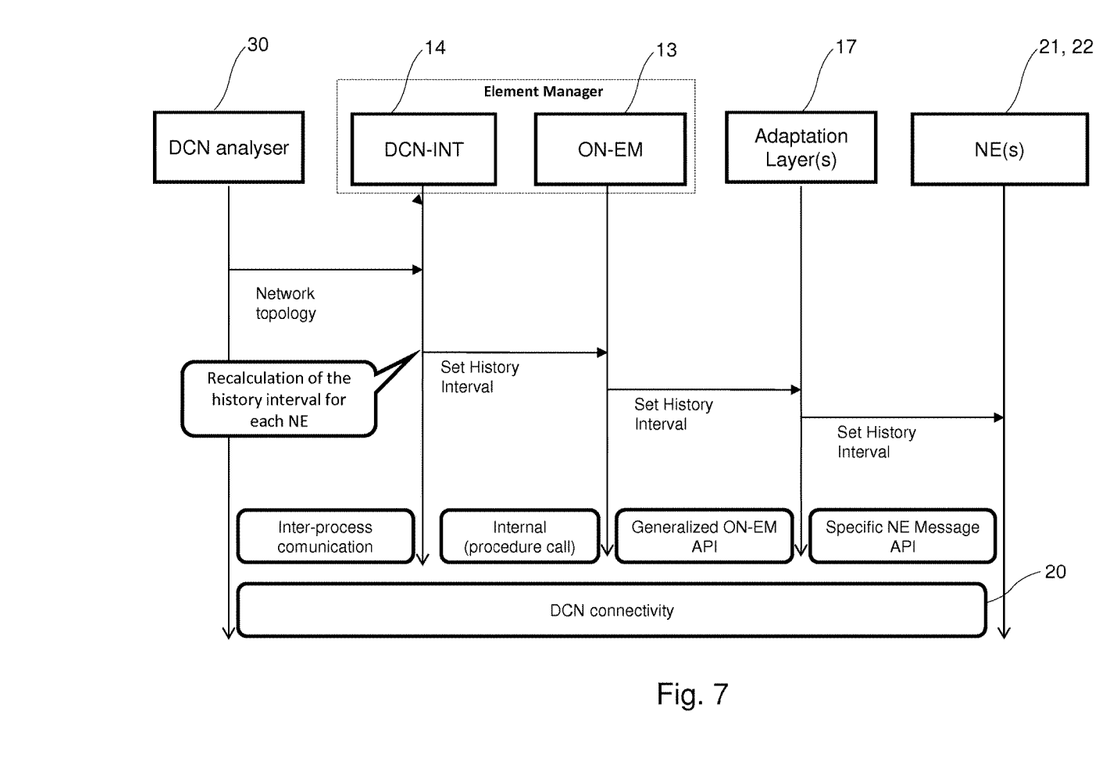
Figure 8:
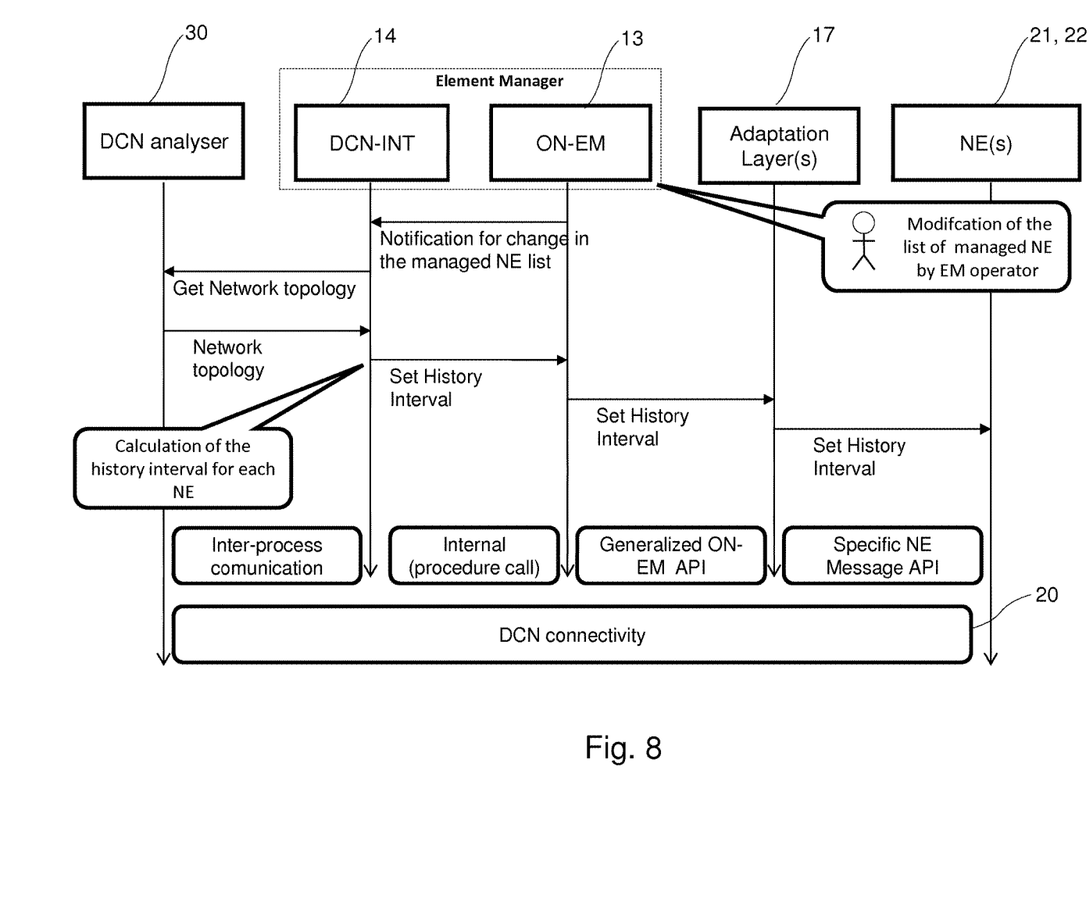

Use Case 1: Network Start-up (FIG. 6)
DCN-INT 14 retrieves the configuration of the network from the DCN ANA component 30;

DCN-INT 14 retrieves from ON-EM 13 the list of the managed NEs 21, 22 and their operational status;
DCN-INT 14 calculates the history control interval for each managed and active NE;
DCN-INT 14 notifies the history control intervals to ON-EM 13;
ON-EM 13 sends the history control intervals to the adaptation layers 17 for each NE 21, 22.
Each adaptation layer is provided for the GNE 21 and subtended NEs 22.

Use Case 2: Network Configuration Update FIG. 7)
DCN-INT 14 captures the modification in the configuration of the network from DCN-ANA 30. This can be due to either a DCN re-configuration or to a DCN fault triggering the activation of a DCN protection path.
DCN-INT 14 re-calculates the history control interval for each NE involved in the modified sub-network.
DCN-INT 14 notifies the history control intervals to ON-EM 13;
ON-EM 13 sends the history control intervals to the adaptation layers for each NE 21, 22.

Use Case 3: New NE Managed on ON-EM (FIG. 8)
ON-EM 13 notifies to DCN-INT 14 an additional NE being managed;
DCN-INT 14 retrieves the configuration of the network;
DCN-INT 14 calculates the history control interval for the new NE and for each NE involved in the related sub-network;
DCN-INT 14 notifies the history control intervals to ON-EM 13;
ON-EM 13 sends the history control intervals to the adaptation layers for each NE.
Each adaptation layer setup the GNE and the subtended NEs.

Use Case 4: NE Unmanaged on ON-EM (FIG. 8)
ON-EM 13 notifies to DCN-INT 14 an NE not being managed anymore;
DCN-INT 14 retrieves the configuration of the network;
DCN-INT 14 calculates the history control interval for each NE involved in the sub-network(s) related to the un-configured NE;
DCN-INT 14 notifies the history control intervals to ON-EM 13;
ON-EM 13 sends the history control intervals to the adaptation layers for each NE.

Use Case 5: NE in Idle Operational State (FIG. 9)
The adaptation layers capture the link down of the NE(s), according to the specific technology;
The information is forwarded to the ON-EM 13;
The ON-EM 13 notifies the information to DCN-INT 14;
DCN-INT 14 retrieves the configuration of the network;
DCN-INT 14 calculates the history control interval for the new NE and for each NE involved in the related sub-network;
DCN-INT 14 notifies the history control intervals to ON-EM 13;
ON-EM 13 sends the history control intervals to the adaptation layers for each NE.

Figure 9:
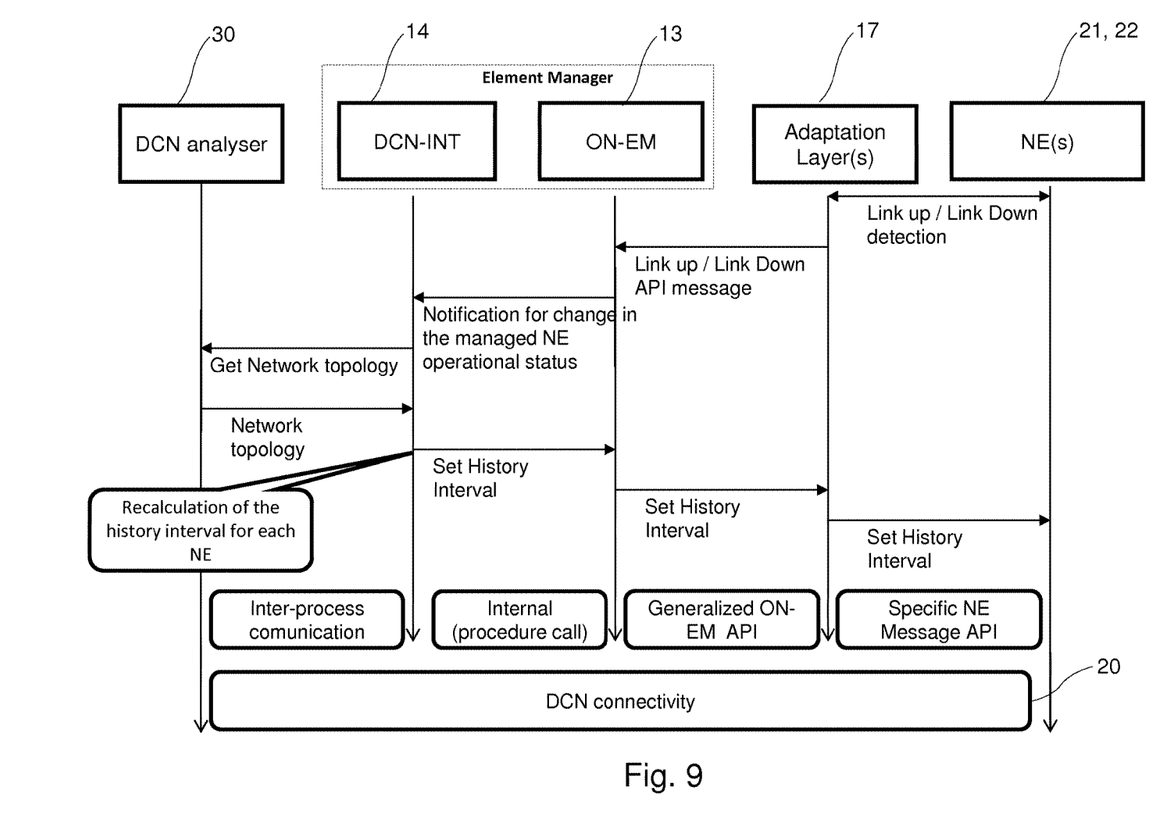

Use Case 6: NE Recovered from the Idle into an Active Operational State (FIG. 9)
The adaptation layers capture the link up of the NE(s), already in the list of the managed ones, according to the specific technology;
The information is forwarded to the ON-EM 13;
The ON-EM 13 notifies the information to DCN-INT 14;
DCN-INT 14 retrieves the configuration of the network;

DCN-INT 14 calculates the history control interval for the new NE and for each NE involved in the related subnetwork;

DCN-INT 14 notifies the history control intervals to ON-EM 13;

ON-EM 13 sends the history control intervals to the adaptation layers for each NE.

In the embodiments described above a minimum value of a collection interval is calculated for a group of subtended NEs having same GNE. It is possible to assign that value of collection interval to each NE. Alternatively, one or more of the NEs in the group can be assigned a value of collection interval which is larger (longer duration interval) than the calculated minimum one.

An advantage of at least one embodiment is assigning to each NE, or group of NEs, a RFC 2819 history control interval for the relevant monitored resources which is compatible with the real DCN connectivity to the OSS application.

An advantage of at least one embodiment is to automatically recalculate and dynamically update the history control interval for all the subtended NEs in case of changes in the DCN topology, adapting them to the new available DCN performances in reaction to the DCN reconfiguration.

An advantage of at least one embodiment is to automatically recalculate and dynamically update the history control interval for all the subtended NEs in case of DCN network failures, maintenance or any other cause of NE link down, adapting them to the new available DCN performances in reaction to the DCN fault events.

An advantage of at least one embodiment is to automatically recalculate and dynamically update the history control interval for all the subtended NEs in case of change in the management configuration i.e. number of NEs managed by a specific management server associated to a network, adapting them to the new ON-EM configuration events.

Figure 10:
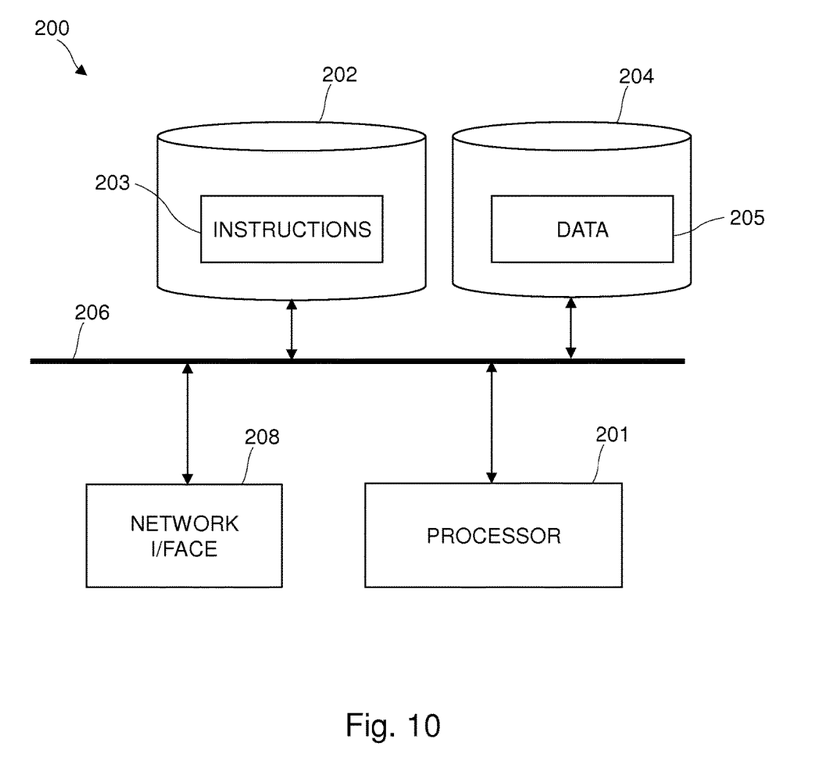
FIG. 10 shows processing apparatus for a computer-based implementation.

FIG. 10 shows an exemplary processing apparatus 200 which may be implemented as any form of a computing and/or electronic device, and in which embodiments of the system and methods described above may be implemented. Processing apparatus 200 can be provided at one of the GNEs 21, NEs 22, or at a node forming part of the OSS 10. Processing apparatus may implement the method shown in FIG. 5. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities, such as other NEs of the DCN 20, or the OSS 10.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for a Management System of a communications network comprising Network Elements, wherein a Data Communication Network couples the Management System to the Network Elements, the Data Communication Network comprising a group of the Network Elements, the group comprising a Gateway Network Element and a number of the Network Elements subtended by the Gateway Network Element, the method comprising:
   a) determining the number of the Network Elements that are subtended by the Gateway Network Element;
   b) determining a value of an interval parameter based on the number of the Network Elements that are subtended by the Gateway Network Element, wherein the interval parameter is a duration over which performance data is collected by each of the group of Network Elements; and
   c) assigning a value of the interval parameter to each of the group of Network Elements based on the determined value,
   wherein step b) comprises determining a minimum value of the interval parameter based on a routing capacity of the Gateway Network Element.

2. A method according to claim 1, wherein the interval parameter is a history control interval parameter.

3. A method according to claim 1, wherein step c) assigns a value of the interval parameter which is equal to, or greater than, the determined minimum value.

4. A method according to claim 1, wherein steps b) and c) are repeated in the event of a change in the number of subtended Network Elements.

5. A method according to claim 4 further comprising at least one of: determining when there is a change of operational status of a Network Element, determining when there is a change in topology of the Data Communication Network, determining when there is a change in management configuration, determining when there is a change in routing capacity due to a change in the Data Communication Network topology, determining when there is a change in routing capacity due to a change in a Data Communication Network protection path.

6. A method according to claim 1, wherein step b) comprises the steps of:
   determining a portion of a routing capacity of the Gateway Network Element available for collection of performance data;
   determining an amount of data required to collect performance data for the group of Network Elements; and
   determining a value of an interval parameter based on the portion of the routing capacity of the Gateway Network Element available for collection of performance data and the amount of data required to collect performance data for the group of Network Elements.

7. A method according to claim 6 wherein the portion of the routing capacity of the Gateway Network Element available for collection of performance data is user-programmable.

8. A method according to claim 1, wherein step b) comprises determining the value of the interval parameter, T, as:

$$T = ((B/b)/(Q*p))$$

where: B is an amount of performance data collected per Gateway Network Element (in Bytes);

P = number of DCN packets required to carry B performance data bytes;

N = number of Network Elements in the group;

b = B/P;

Q = routing capacity (in packets per second) of the Gateway Network Element; and p = percentage of gateway allocated for performance collection.

9. A method according to claim 1, further comprising receiving an input from a Network Analyser indicative of the number of Network Elements that are subtended by the Gateway Network Element.

10. A method according to claim 1, wherein the communications network comprises at least two Gateway Network Elements, and steps a) to c) are carried out for each Gateway Network Element.

11. A Management System for a communications network comprising Network Elements, the Management System comprising:

a first interface, wherein the first interface connects to a Data Communication Network, wherein the Data Communication Network couples the Management System to the Network Elements, and wherein the Data Communication Network comprises a group of the Network Elements, the group comprising a Gateway Network Element and a number of the Network Elements subtended by the Gateway Network Element;

a second interface, wherein the second interface receives information about the Data Communication Network;

an interval parameter determining module, wherein the interval parameter determining module, via a processor:

a) determines the number of the Network Elements that are subtended by the Gateway Network Element;

b) determines a value of an interval parameter based on the number of the Network Elements that are subtended by the Gateway Network Element, wherein the interval parameter is a duration over which performance data is collected by each of the group of Network Elements; and c) assigns a value of the interval parameter to each of the group of Network Elements based on the determined value, wherein the interval parameter determining module determines a minimum value of the interval for each of the subtended Network Elements based on a routing capacity of the Gateway Network Element.

12. A Management System according to claim 11 wherein the second interface comprises an interface, wherein the interface connects to a Data Communication Network Analyser.

13. A Management System according to claim 11, wherein step c) assigns a value of the interval parameter which is equal to, or greater than, the determined minimum value.

14. A Management System according to claim 11, wherein the interval parameter determining module:

determines a portion of a routing capacity of the Gateway Network Element available for collection of performance data;

determines an amount of data required to collect performance data for the group of Network Elements; and determines a value of an interval parameter for the Network Elements based on the portion of the routing capacity of the Gateway Network Element available for collection of performance data and the amount of data required to collect performance data for the group of Network Elements.

15. A Management System according to claim 11, wherein the Management System comprises an Optical Network Element Manager, ON-EM.

16. A communications network comprising a Management System according to claim 11, the Gateway Network Element and the number of Network Elements subtended by the Gateway Network Element.

* * * * *